United States Patent Office 3,342,614
Patented Sept. 19, 1967

3,342,614
FIRE RESISTANT ASPHALTIC COMPOSITIONS
Russell E. Koons, St. Louis, Mo., assignor to Monsanto Company, a corporation of Delaware
No Drawing. Filed Dec. 8, 1961, Ser. No. 158,130
2 Claims. (Cl. 106—15)

The present invention relates to a new composition of matter. More particularly, the present invention relates to a fire resistant asphaltic composition which may be utilized in preparing mastics, roofing, wire coatings, impregnated paper or other cellulosic material, plastic cement and the like.

The use of asphalt and other bituminous materials in the preparation of mastics, roofing, wire coatings, impregnated paper, etc., is well known. Due to the combustible nature of such materials, however, their use has been severely limited in many areas. Even in the areas where they are frequently used, it is desirable and, in many instances, necessary to reduce their combustibility. The common method of reducing this combustibility is by the addition of chemicals and materials such as certain chlorinated organic compounds and/or non-combustible fillers. Examples of bituminous compositions containing fire retardant materials are found in U.S. Patent Nos. 2,861,012 and 1,167,195. The chemicals used with asphalts, tars, etc., to impart fire resistant properties to the finished product are usually rather expensive and must be used in relatively large quantities. In addition, many of these chemicals are rather toxic and for this reason dangerous and undesirable. There is then a need for fire retardant bituminous compositions wherein the bituminous material itself has improved fire retardant properties. Such compositions would have fire retardant properties at least equivalent to the presently known fire retardant bituminous compositions and yet would need less fire retardant additives to impart these properties.

It is then an object of the present invention to provide a new and novel asphaltic composition. A more particular object of the present invention is to provide an asphaltic composition having significantly improved fire retardant properties. Another particular object of the present invention is to provide an asphaltic composition prepared from a particular asphalt, the asphaltic composition having significantly improved fire retardant properties. Additional objects will become apparent from the following description of the invention herein disclosed.

In fulfillment of these and other objects, it has been found that an asphaltic composition comprised of as high as 97 and as low as 80 percent by weight of a particular low penetration asphalt and 3 to 20 weight percent of a fire retardant chemical possesses fire retardant properties substantially superior to those of known fire retardant bituminous compositions. The particular low penetration asphalt which is the basic component of the present fire retardant composition is one having the following properties: A penetration of 3 to 35 at 77° F., a softening point of 130 to 300° F. Asphalts having these properties may be obtained by the vacuum reduction, solvent treatment, air blowing or a combination of these of the residium from the "topping" of a crude petroleum. This residium material is generally known as a topped crude oil and is that which remains after the atmospheric distillation of crude petroleum to remove gas, gasoline, naphthas, kerosene, distillates or diesel oil and gas oil. The most preferred asphalts of the present invention are those which have been obtained by (1) The solvent extraction of a topped crude oil with normally gaseous hydrocarbons such as butane and/or propane to obtain an asphalt of less than 20 penetration at 77° F. or (2) The solvent extraction or vacuum reduction of such residium to obtain an asphalt of less than 70 penetration at 77° F. with subsequent air blowing to less than 35 penetration. The asphalts obtained by the first method above have a penetration of 0 to 20 at 77° F., and a softening point of 150 to 250° F. while those obtained by the second method have a penetration of 0 to 35 at 77° F. and a softening point of 130 to 250° F.

The fire retardant chemicals which are a part of the herein disclosed composition should be stable up to temperatures of 250° F. or higher. Further, these chemicals must be compatible with the asphalt and not exude from the composition on heating or under the exposure of service for which the composition is intended. Also, the fire retardant chemicals must have a low volatility to prevent their evaporation from the composition at the elevated temperatures generated by approaching or nearby fires as well as under more normal service conditions. Preferred fire retardant chemicals are halogen containing organic compounds such as chlorinated paraffins and polychlorinated polyphenyls and also certain organic phosphorus containing compounds. Non-limiting examples of halogenated organic compounds are such compounds as Aroclor 1248, 1254 and 1260, marketed by Monsanto Chemical Company, which are polychlorinated polyphenyls, Clorowax 40 and 70, marketed by Diamond Alkali Company, hexachlorodiphenyl oxide and hexabromodiphenyl oxide. Particularly preferred fire retardant chemicals for the present composition are the organic phosphates. Several non-limiting examples of fire retardant organic phosphates which may be utilized in the present coating compositions are tricresylphosphate, triphenylphosphate, cresyldiphenyl phosphate, tri-o-chlorophenyl phosphate and tris(2,3-dibromopropyl)phosphate. As previously stated, the amount of fire retardant chemical added as a part of the present composition may range from 3 to 30 percent by weight of the asphalt-fire retardant additive mixture. It is somewhat preferred, however, that the amount of fire retardant chemical in the new composition disclosed herein be within the range of approximately 5 to 15 percent by weight. If fillers, solvents, or other additives are used in asphaltic formulations, this percentage is correspondingly reduced by dilution.

In many of the applications of the present fire-retardant asphaltic blend, such as the preparation of mastics, it will be desirable in many instances to use a vehicle. If the use of the present fire retardant asphalt is such that its fire retardant properties are needed only after curing of the asphalt, virtually any of the conventional hydrocarbon vehicles such as petroleum naphtha may be used. However, if the fire retardant properties are needed from the outset prior to curing, then a vehicle with low flammability and self extinguishing properties must be used. It has been found that vehicle mixtures particularly effective in this respect are those containing 0 to 60 percent by weight of an aromatic naphtha within the boiling range of 80–360° F. and 100 to 40 percent by weight of a volatile halogenated organic compound such as perchloroethylene. A preferred vehicle is one containing 50 percent by weight of an aromatic naphtha boiling from 300 to 360° F. and 50 percent by weight of perchloroethylene.

In addition to fire retardant additives, asphalt and solvents, it is often desirable and necessary to have present in the compositions of the present invention a mineral filler to impart certain properties necessary for a given end use. These fillers, in many instances, are resistant to fire themselves and therefore decrease to some extent the flammable properties of the total mixture. The amount of filler used will generally range from as low as 1 percent by weight and lower to as high as 50 percent by weight and higher of the total composition. More often, however, the amount of filler when used will range from 10 to 35 percent by weight of the compositions. Usable fillers include all of the fillers known to the art for inclusion in asphaltic compositions. Such fillers include various asbestos fibers, granular asbestos, slate flour, diatomaceous earth, clay, powdered mica, powdered silica, unexpanded and expanded vermiculite, and unexpanded and expanded perlite. The choice of type and amount of mineral filler will be generally dependent upon the particular end use. For example, a particularly tough, tear resistant asphaltic mastic is obtained when the cured product contains, in addition to asphalt and fire retardant chemical, approximately 20 weight percent of 7T asbestos and 12 weight percent of slate flour. The latter, being finely ground, has been found to increase the viscosity of the asphaltic composition, reducing its tendency to flow when subjected to high temperatures or mechanical blows.

The fire retardant asphaltic compositions prepared in accordance with the present invention find excellent utility in a host of applications. They may be used in the preparation of mastics, roofing materials, wire coatings, impregnated paper and other cellulosic material, plastic cement and the like. Regardless of the application, however, the present composition is significantly improved in fire retardant properties over the known asphaltic compositions. This is well illustrated by the series of tests described below.

Several asphaltic mastics were prepared. Fire tests on these mastics are given in the table below. The asphaltic mastics were spread $\frac{3}{32}$ inch thick on calcium silicate blocks and cured in an oven at 140° F. for one week to evaporate all volatile solvents from the blend. The resulting panels were then subjected to a fire test by exposure to a standard flame. After 200 seconds' exposure to the flame, the percent of the panel burning was recorded and the flame removed. The time between the removal of the flame and complete self-extinguishment of the burning asphalt was also recorded. The percent of the asphalt panel burning after 200 seconds' exposure to a standard flame and the rate at which the burning asphalt self-extinguishes are indicative of the fire resistance of the asphalt composition.

| | Composition of the Asphaltic-fire Retardant Mixture | Percent of Panel Burning at 200 Seconds | Seconds Until Self-Extinglishing Occurred |
|---|---|---|---|
| A | A vacuum reduced asphalt of 90 penetration at 77° F. | 40 | 300+ |
| B | A vacuum reduced asphalt of 90 penetration at 77° F. containing 10 weight percent of Aroclor 1262.* | 31 | 58 |
| C | A vacuum reduced asphilt of 90 penetration at 77° F. which was air blown to 18 penetration at 77° F. containing 17 weight percent of Aroclor 1254.* | 14 | 15 |
| D | The asphalt of C containing 17 weight percent of tricresyl phosphate. | 14 | 12 |
| E | Propane extracted residue of 39 penetration at 77° F. which was air blown to 1 penetration at 77° F. containing 14 weight percent tricresyl phosphate. | 8 | 1 |
| F | Propane extracted residue of 3 penetration at 77° F. containing 8 weight percent of tricresyl phosphate. | 3 | 1 |
| G | Propane extracted residue of 33 penetration at 77° F. which was air blown to 1 penetration at 77° F. containing 13.5 percent of tricresyl phosphate. | 1 | 0 |

* The Aroclor compounds are polychlorinated polyphenyls.

Compositions C, D, E, F and G above represent compositions prepared in accordance with the present invention. The E, F and G compositions represent the preferred compositions of the present invention. A comparison of compositions B and F dramatically illustrates the superiority of the asphaltic compositions disclosed herein over a more generally known composition in regard to their fire retardant properties. There is in the F composition greater than a 900 percent decrease in the percent of the panel burning after 200 seconds and a 5700 percent decrease in the time necessary for self-extinguishment. This improvement with the asphalt of the present invention is obtained while using 2 percent less of a fire retardant chemical than the other asphalt. The unexpectedness of such results was made more apparent with the determination that while a reduction in penetration of only 87 at 77° F. brought about the above startling results, a reduction in penetration of approximately 120 at 77° F. caused an increase in the flash point of only 16° C., or from approximately 333° C. to approximately 349° C.

The following examples illustrate the use of the herein disclosed asphaltic compositions.

I. A fire retardant mastic with low permeability to water vapor:

| Components— | Percent by wt. |
|---|---|
| 35 penetration propane extracted asphalt, air blown at 500° F. to 1 penetration at 77° F. | 43.6 |
| Tricresyl phosphate | 5.9 |
| Petroleum naphtha, 300/360° F. boiling range | 26.6 |
| Slate flour | 9.3 |
| 7T asbestos | 14.6 |
| | 100.0 |

This mastic was sprayed on a prepared surface and allowed to cure free of the petroleum solvent, and it was found to have the following properties:

(1) It gave excellent protection to steel in the prevention of corrosion.

(2) It was very durable with respect to outside weathering conditions.

(3) The permeability to water vapor was found to be very low (.002 perm.-inch).

(4) It had excellent resistance to abrasion.

(5) In a comparative fire test, as described previously in this specification, it had excellent fire retardant properties.

II. A fire retardant mastic with high permeability to water vapor:

| Components— | Percent by wt. |
|---|---|
| 35 penetration propane extracted asphalt, air blown at 500° F. to 1 penetration at 77° F. | 25.0 |
| Tricresyl phosphate | 3.4 |
| Aromatic naphtha, 300 to 360° F. boiling range | 27.9 |
| Perchloroethylene | 27.9 |
| Expanded vermiculite (Zonolite No. 4) | 5.3 |
| 7M asbestos | 10.5 |
| | 100.0 |

This fire retardant mastic was found to be suitable for application over damp insulation material. It was also found to be self extinguishing in the uncured state. On curing, it was found to possess the same desirable properties listed under I above. The major difference in the cured film was the permeability. A permeability of 0.027 perm.-inch allowed the escape of water vapor from the underlaying insulation materials without the formation of blisters, and yet prevented water on the outside surface from penetraing the film in the liquid form.

Any number of other similar useful compositions may be prepared and found to have the same properties as those described above. However, a particularly effective group of such compositions containing vehicle and filler are those containing 20 to 55 percent by weight of the special asphalts of the present invention, 1 to 10 percent by weight of a fire retardant organic chemical, 10 to 35 percent by weight mineral filler and 20 to 60 percent by weight of a volatile solvent.

Those skilled in the art will readily appreciate that numerous asphaltic compositions having a host of end uses as yet undeveloped may be prepared in accordance with the present invention. Regardless to what end use the compositions disclosed herein are put, such use is within the spirit and scope of the present invention.

I claim:

1. A fire resistant composition consisting essentially of 80 to 97 percent by weight of an asphalt having a penetration of 0 to 35 at 77° F. and a softening point of 130 to 300° F. and 3 to 20 percent by weight of a fire retardant chemical, wherein the fire retardant chemical is a chlorinated paraffin.

2. A fire resistant composition consisting essentially of 80 to 97 percent by weight of an asphalt having a penetration of 0 to 35 at 77° F. and a softening point of 130 to 300° F. and 3 to 20 percent by weight of a fire retardant chemical, wherein the fire retardant chemical is selected from the group consisting of polychlorinated polyphenyls and polybrominated polyphenyls.

References Cited

UNITED STATES PATENTS

| 2,025,929 | 12/1935 | Young | 106—16 XR |
| 2,693,425 | 11/1954 | Hardman | 106—273 |
| 2,926,096 | 2/1960 | Sakornbut | 106—15 |
| 3,035,930 | 5/1962 | Talley | 106—273 |
| 3,053,714 | 9/1962 | Edwards | 106—281 XR |

OTHER REFERENCES

Zimmerman et al.: Handbook of Material Trade Names, 1953 edition (page 65, Aroclor, relied upon).

The Condensed Chemical Dictionary, sixth edition, Reinhold Print. Corp., New York (page 108, Aroclor, relied upon).

ALEXANDER H. BRODMERKEL, *Primary Examiner.*

MORRIS LIEBMAN, J. B. EVANS,
*Assistant Examiners.*